United States Patent [19]
Braatz et al.

[11] Patent Number: 6,064,809
[45] Date of Patent: May 16, 2000

[54] FAST MODEL PREDICTIVE ELLIPSOID CONTROL PROCESS

[75] Inventors: Richard D. Braatz, Urbana; Jeremy G. VanAntwerp, Champaign, both of Ill.

[73] Assignee: The Board of Trustees of the University of Illinois, Urbana, Ill.

[21] Appl. No.: 09/092,280

[22] Filed: Jun. 5, 1998

[51] Int. Cl.[7] .................................................. G05B 13/05
[52] U.S. Cl. ........................... 395/500.23; 703/2; 700/37; 700/45; 708/322; 702/85
[58] Field of Search .......................... 395/500.23, 500.34; 364/150, 151, 153, 164, 165; 708/322; 700/33, 37, 45, 165; 702/85; 324/76.31

[56] References Cited

U.S. PATENT DOCUMENTS

| | | | |
|---|---|---|---|
| 5,301,101 | 4/1994 | MacArthur et al. | 364/156 |
| 5,351,184 | 9/1994 | Lu et al. | 364/165 |
| 5,519,605 | 5/1996 | Cawlfield | 364/151 |
| 5,561,599 | 10/1996 | Lu | 364/164 |
| 5,572,420 | 11/1996 | Lu | 364/153 |
| 5,633,795 | 5/1997 | Popovich | 364/148 |
| 5,749,020 | 5/1998 | Mestha et al. | 399/49 |
| 5,781,430 | 7/1998 | Tsai | 364/148 |

OTHER PUBLICATIONS

F.J. Doyle, J.F. Pekny, P. Dave, "Application of Large Scale MPC to Paper Machines", Weyerhaeuser Workshop on Modeling and Control of Kamyr Digesters and Paper Machines Tacoma, Washington, 1995.

P. Dave, D.A. Willig, G.K. Kudva, J.F. Pekny, F.J. Doyle, "LP Methods in MPC of Large–Scale Systems: Application to Paper–Machine CD Control", *AIChE Journal*, vol. 43, No. 4, Apr. 1997, pp. 1016–1031.

P. Dave, D.A. Willig, G.K. Kudva, J.F. Pekny, F.J. Doyle, "LP Methods in MPC of Large Scale Systems—Application to Paper Machine CD Control", *CIPAC Technical Report 96–15*, Purdue University, School of Chemical Engineering, West Lafayette, Indiana 47907, 1996.

L.G. Khachiyan, M.J. Todd, "On the Complexity of Approximating the Maximal Inscribed Ellipsoid for a Polytope", *Mathematical Programming*, 61:137–159, 1993, pp. 137–159.

R.D. Braatz, J.G. VanAntwerp, "Advanced Cross–Directional Control", *Pulp & Paper Canada*, 98:7 (1997) pp. 41–43.

S. Boyd, S. Wu, user guide "sdpsol: A Parser/Solver for Semidefinite Programming and Determinant Maximization Problems with Matrix Structure", Stanford University, Stanford, CA.

A. Zheng, "Linear Quadratic Model Predictive Control: Is QP Necessary?", presented at AiChE Annual Meeting, 1996.

R.D. Braatz, J.G. VanAntwerp, "Advanced Cross–Directional Control", *Control Systems '96 Preprints*, Apr. 30–May 2, 1996, pp. 14–18.

R.D. Braatz, M.L. Tyler, M. Morari, "Identification and Cross–Directional Control of Coating Processes", *AiChE Journal*, vol. 38, No. 9, Sep. 1992, pp. 1329–1339.

(List continued on next page.)

*Primary Examiner*—Kevin J. Teska
*Assistant Examiner*—Thai Phan
*Attorney, Agent, or Firm*—Greer, Burns & Crain, Ltd.

[57] ABSTRACT

A model predictive control process which approximates a constraint set as an ellipsoid to directly address actuator limitations, to provide a robust controller structure, and reduce computation demands. A bounded polytope defining the constraint set is approximated as an ellipsoid in an off-line computation. The ellipsoid is scaled on line via bisection to determine the ellipsoid that optimally fits the polytope, calculating a set of control moves for manipulating device actuators. Preferably, an unconstrained solution is first computed and tested to see if any constraints are violated. If none are violated, it is accepted, if one or more are violated, the scaling is reconducted as a constrained solution in iterative fashion until the solution yields an active constraint.

8 Claims, 8 Drawing Sheets

OTHER PUBLICATIONS

S. Boyd, L. ElGhaoui, E. Feron, V. Balakrishnan, "Some Standard Problems Involving LMIs", Chapter 2 from *Linear Matrix Inequalities in System and Control Theory*, Society for Industrial and Applied Mathematics, Philadelphia, pp. 7–35.

S. Boyd, L. ElGhaoui, E. Feron, V. Balakrishnan, "Some Matrix Problems", Chapter 3 from *Linear Matrix Inequalities in System and Control Theory*, Society for Industrial and Applied Mathematics, Philadelphia, pp. 37–50.

S. Boyd, L. ElGhaoui, E. Feron, V. Balakrishnan, "Applications in Convex Optimization", Chapter 6 from Linear Matrix Inequalities in System and Control Theory, Society for Industrial and Applied Mathematics, Philadelphia, pp. 217–271.

Y. Nesterov, A. Nemirovskii, "Acceleration for Linear and Linearly Constrained Quadratic Problems", Chapter 8 from *Interior–Piont Polynomial Algorithms in Convex Programming*. Society for Industrial and Applied Mathematics, Philadelphia, pp. 315–359.

FIG.1

FIG.2a
CD profile for the RE algorithm

FIG.2b (PRIOR ART)
CD profile for the QP

Sensor number

FIG.2c
Actuator settings for the RE algorithm

FIG.2d (PRIOR ART)
Actuator settings for the QP

Actuator position

FIG.3a
CD profile for the RE algorithm

FIG.3b (PRIOR ART)
CD profile for the QP

Sensor number

FIG.3c
Actuator settings for the RE algorithm

FIG.3d (PRIOR ART)
Actuator settings for the QP

Actuator position

FIG.4a
CD profile for the RE algorithm

FIG.4b (PRIOR ART)
CD profile for the QP

Sensor number

FIG.4c
Actuator settings for the RE algorithm

FIG.4d (PRIOR ART)
Actuator settings for the QP

Actuator position

FIG.5

FIG.6a
CD profile for the RE algorithm

FIG.6b (PRIOR ART)
CD profile for the QP

Sensor number

FIG.6c
Actuator settings for the RE algorithm

FIG.6d (PRIOR ART)
Actuator settings for the QP

Actuator position

FIG.7a
CD profile for the RE algorithm

Sensor number

FIG.7b (PRIOR ART)
CD profile for the QP

FIG.7c
Actuator settings for the RE algorithm

FIG.7d (PRIOR ART)
Actuator settings for the QP

Actuator position

FIG. 8a
CD profile for the RE algorithm

FIG. 8b (PRIOR ART)
CD profile for the QP

Sensor number

FIG. 8c
Actuator settings for the RE algorithm

FIG. 8d (PRIOR ART)
Actuator settings for the QP

Actuator position

FAST MODEL PREDICTIVE ELLIPSOID CONTROL PROCESS

FIELD OF THE INVENTION

The present invention concerns model predictive control of a process. The invention is generally applicable to physical processes having manipulated variables subject to a constraint set, defining, for example, the maximum physical range for an actuator. By way of example, a sheet and film process is used to illustrate the principles of the invention. Artisans will appreciate the general applicability of the invention to other model controlled processes.

BACKGROUND OF THE INVENTION

Most physical processes sought to be controlled through modeling require a fast solution to a set of manipulated variables based upon a measured condition. The variables are frequently interdependent, and are subject to a constraint set that defines physical limitations of the physical actuators. Implementation of a desired control move therefore requires a fast solution that does not violate the constraints. Because of the complexities of the large number of constrained and potentially interdependent variables, typical optimal solutions to implement a control move are too computationally expensive.

These problems are encountered, for example, in the model predictive control of sheet and film processes. Sheet and film processes are prevalent in the chemical and pulp and paper industries, and include paper coating, polymer film extrusion, and papermaking. In this process, a sheet or film is moved via a web and is processed as it moves. The multivariable control of sheet and film processes is challenging due to their large dimensionality, model inaccuracies, and actuator limitations. On-line computation time for the control algorithm is limited by the scale and speed of the processes. This additional limitation has yet to be solved by the ever increasing processing speeds achieved by control hardware. Uncertainty is introduced into the model by low signal-to-noise ratios, sideways movement of the web, and imprecise actuator movements. An additional difficulty is the need to avoid excessive actuator movements that may compromise the integrity of the sheet/film and the actuating mechanism.

Conventional industrial control algorithms for sheet and film processes are kept relatively simple to handle the process dimensionality within the computational constraints. The simplicity is often achieved by choosing a sampling time for the control algorithm that is 100–1000 times longer than the time between individual sensor readings. An alternative or additional simplification strategy is the grouping of sensors into sensor blocks to reduce dimensionality. Model inaccuracies are addressed through excessive detuning. This simplicity results in reduced product quality and a loss of flexibility.

Some additional methods have been proposed for designing controllers for sheet and film processes which are robust to model inaccuracies but do not directly address actuator limitations. Other approaches have been proposed that directly address actuator limitations, but do not directly address model inaccuracies. Either of these approaches require significant computation for implementation on large scale machines rendering them inefficient or impractical to implement with much existing control hardware.

An improved control method was recently proposed by the inventors which: (i) directly addresses actuator limitations, (ii) has minimal on-line computational requirements, and (iii) has a controller structure proven to be robust to model inaccuracies. R. D. Braatz and J. G. VanAntwerp, "Model Predictive Control of Large Scale Processes", In AIChE Spring National Meeting, New Orleans, La., Feb. 27, 1996, Paper 81c; R. D. Braatz and J. G. VanAntwerp, "Advanced Cross-Directional Control", Control Systems '96Preprints, pp 15–18, Halifax, Nova Scotia, Canada, April 30–May 2, 1996. However, the method was only applicable to sheet and film processes in which all manipulated variable directions are controllable and the dynamics are adequately described by a pure time delay. These assumptions do not always hold in practice.

Thus, there is a need for an improved model predictive control process which addresses problems encountered in previous processes. It is an object of the invention to provide such an improved process. The improved process of the invention uses an ellipsoid constraint set approximation as part of an improved high speed control solution implementation.

SUMMARY OF THE INVENTION

The present invention concerns a model predictive control process that directly addresses actuator limitations, has a controller structure that has been mathematically proven to be robust to model inaccuracies, and has minimal on-line computational requirements. A bounded finite polytope representing the actuator constraint set is approximated as an ellipsoid during a first step. Subsequently, the ellipsoid is scaled, preferably via bisection, to find the ellipsoid that optimally approximates the polytope. This scaling yields a control move solution. Preferably, the control move solution is first conducted without regard to the constraints and then the solution is checked to see if the constraints are violated. If none are violated, the solution is accepted. If one or more constraints are violated, the solution is iteratively conducted via the ellipsoid approximation and scaling as a constrained solution until a solution yields an active constraint.

BRIEF DESCRIPTION OF THE DRAWINGS

Many other features, objects and advantages will be apparent to artisans by reading the detailed description and referring to the attached drawings, of which.

DETAILED DESCRIPTION OF THE PREFERRED EMBODIMENT

The present invention is generally applicable to the control of multivariable constrained physical processes for which the general model predictive control statement is applicable. For purposes of illustration only, the invention is described primarily with respect to a sheet and film process for which experimental simulation and comparison data has been developed by the inventors. Artisans will readily appreciate the general applicability of the invention to a wide range of physical processes for which models have been developed and will be developed to fit the general model predictive control statement. By way of example but without limiting the invention thereto, additional physical processes to which the invention is applicable include chemical reactors, distillation columns, absorbers, crystallizers, dryers, evaporators, other separations and unit operations, and entire chemical plants.

Figure 1:
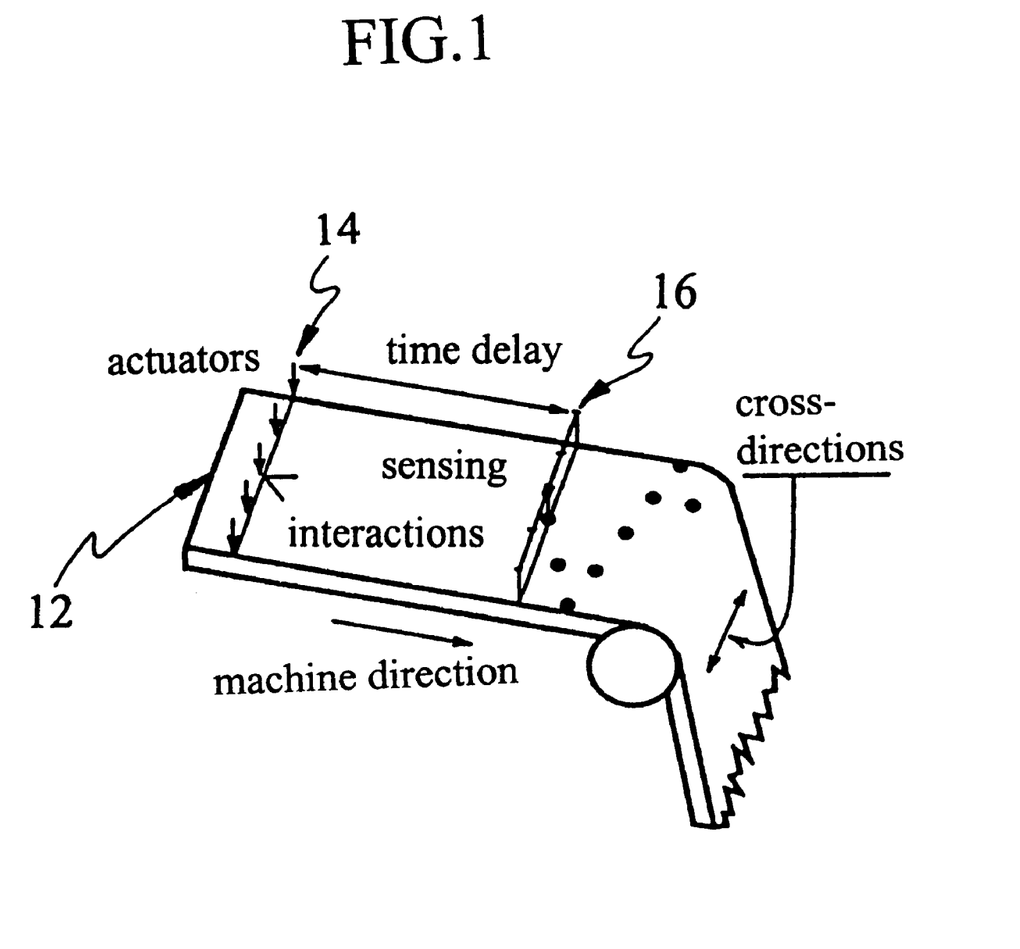
FIG. 1 is a schematic diagram of an exemplary sheet and film process to which the present invention is applicable.
Figure 2A:
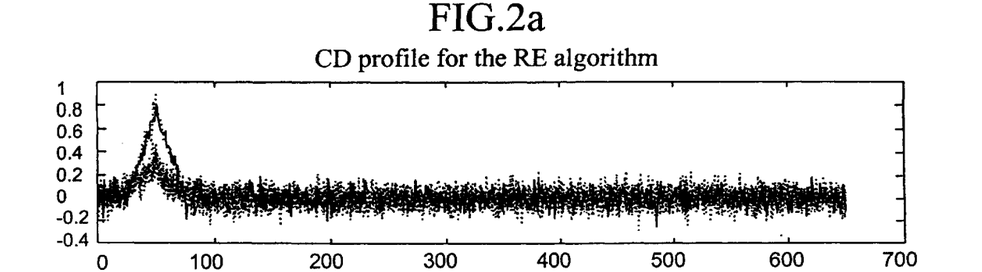
FIGS. 2a–2d are measurement profiles and manipulated variable settings for the conventional (QP) and present (RE) processes when the web has an initial profile with a bump near the edge. The initial measurement profile is shown as a solid line, subsequent profiles are dashed. In all, ten control moves are shown.
Figure 2B:
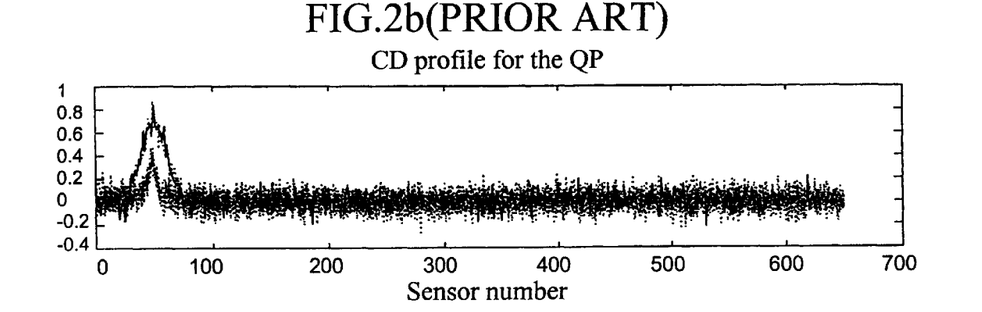
Figure 2C:
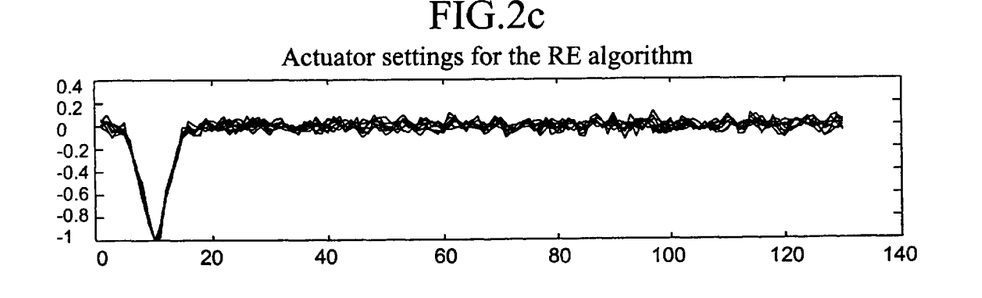
Figure 2D:
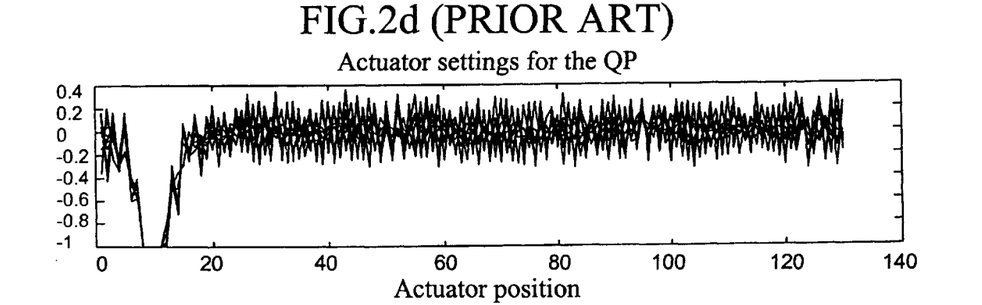
Figure 3A:
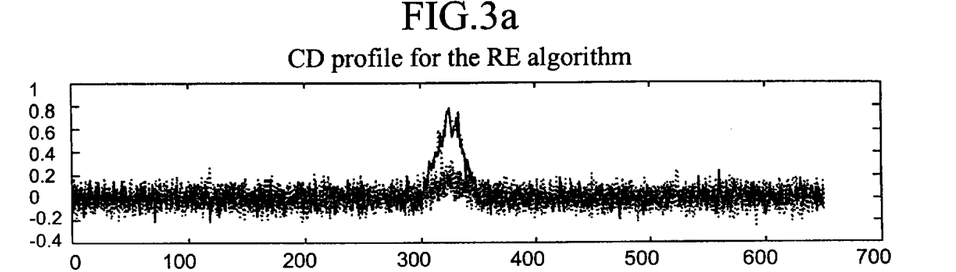
FIGS. 3a–3d are measurement profiles and manipulated variable settings for the QP and RE algorithms when the web has an initial profile with a bump in the middle. The initial measurement profile is shown as a solid line, subsequent profiles are dashed. In all, ten control moves are shown.
Figure 3B:
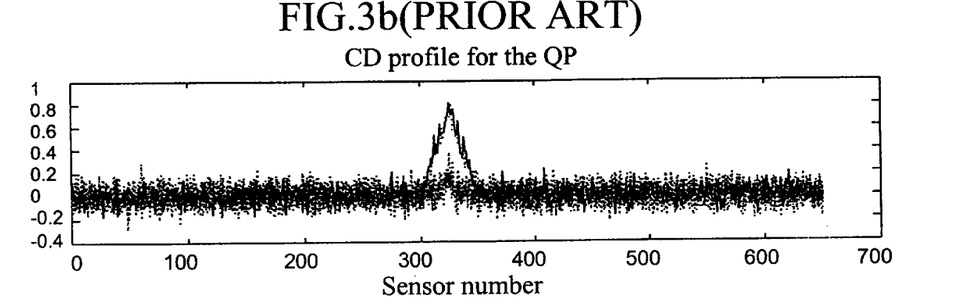
Figure 3C:
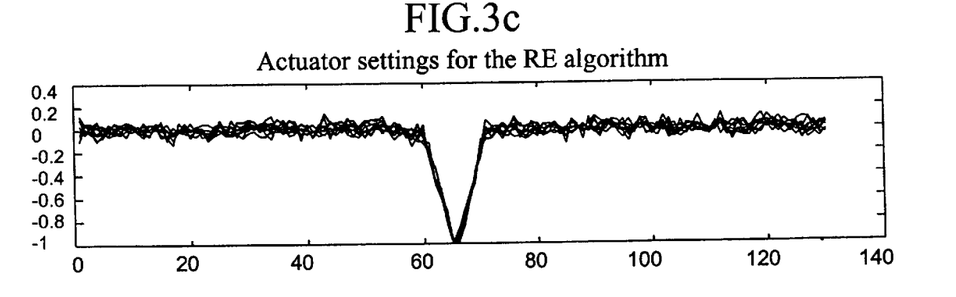
Figure 3D:
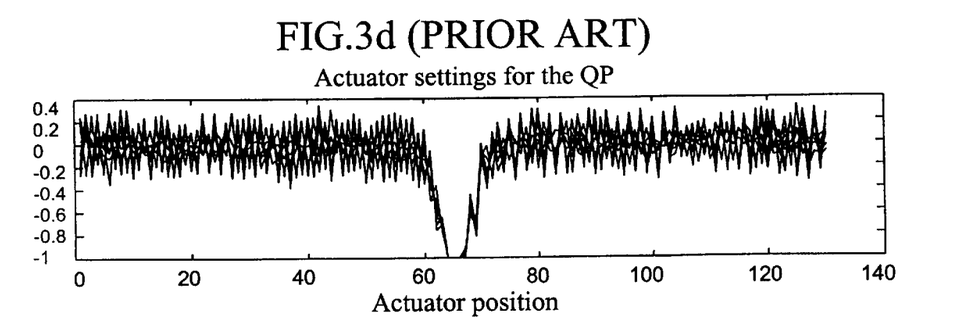
Figure 4A:
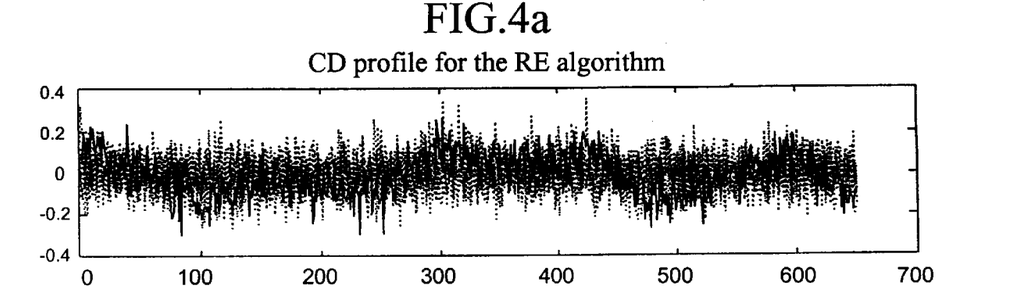
FIGS. 4a–4d are measurement profiles and manipulated variable settings for the QP and RE processes when the web has a pseudo-random initial profile. The initial measurement profile is shown as a solid line, subsequent profiles are dashed. In all, ten control moves are shown.
Figure 4B:
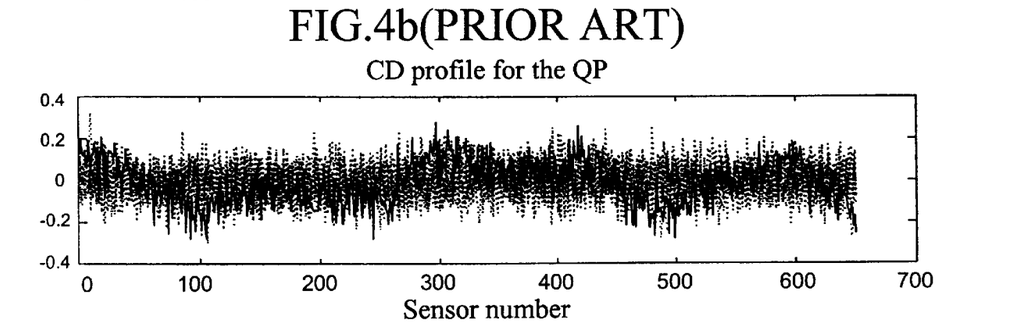
Figure 4C:
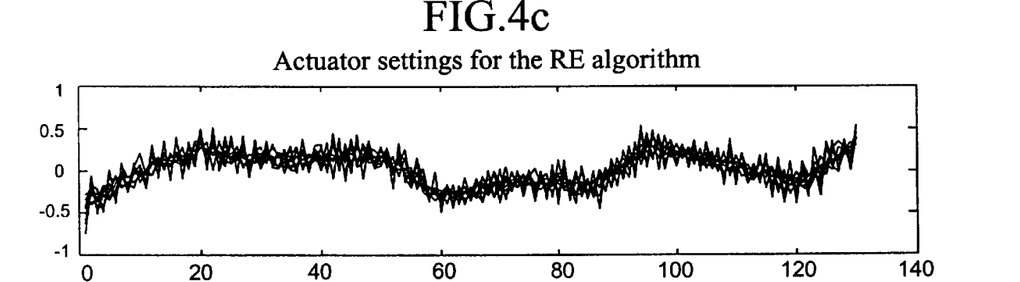
Figure 4D:
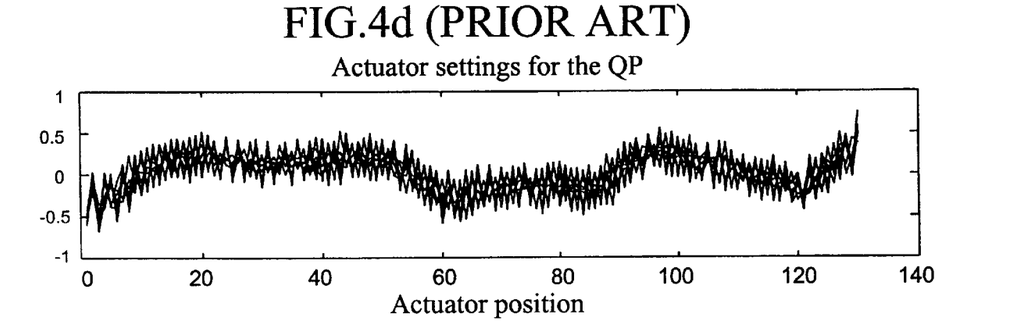

A sheet and film process is generally illustrated in FIG. 1. It includes a moving web 12, multiple actuators 14, and multiple sensors 16. The sensors' output are used to determine whether desired criteria for the sheet are being met. When some variance is detected by comparison to stored goals, a desired control move is computed according to the model predictive control for the process. The present invention improves that determination.

As is standard in model predictive control (MPC), the process is represented by its finite impulse response $$y(k+1) = y(k) + P\left(\sum_{i=0}^{n_T} \beta_i u(k-i)\right) \quad (1)$$

where u(k) is the vector of manipulated moves and y(k) is the sheet/film profile at time instance k, and P is the interaction matrix which is assumed to be linear over the operating region (a good assumption in practice). The number of impulse response coefficients used to model the system is $n_T$ and $$\beta_i = \frac{g_{i+1} - g_i}{g_1}, \forall i = 1, \ldots, n_T \quad (2)$$

where $g_i$ is the scalar such that $g_i P$ is the ith impulse response coefficient matrix, $\forall i=1, \ldots, n_T$ and 0 otherwise. This description can model a system with time delays by setting $\beta_i = 0$, $\forall i=1, \ldots, \Theta$ where $\Theta \geq 1$ is the time delay of the process. The interaction matrix P for a sheet and film process is typically nonsquare and singular or nearly singular.

The constraints on the manipulated variables form a polytope.

$$u(k) \in \wp \equiv \{u(k) | Au(k) \leq b\} \quad (3)$$

For example, known manipulated variable constraints for a sheet and film process are $$u_l \leq u(k) \leq u_h, \quad (4)$$

$$-l_b \leq Fu(k) \leq l_b, \quad (5)$$

$$F = \begin{bmatrix} -1 & 1 & 0 & \cdots & \cdots & \cdots & 0 \\ 1 & -2 & 1 & \ddots & \ddots & \ddots & \vdots \\ 0 & 1 & -2 & \ddots & \ddots & \ddots & \vdots \\ \vdots & \ddots & \ddots & \ddots & \ddots & \ddots & \vdots \\ \vdots & \ddots & \ddots & \ddots & -2 & 1 & 0 \\ \vdots & \ddots & \ddots & \ddots & 1 & -2 & 1 \\ 0 & \cdots & \cdots & \cdots & 0 & 1 & -1 \end{bmatrix} \quad (6)$$

The model predictive control problem is to compute u(k) as the solution to the following quadratic program $$\min_{u(k) \in \wp} \sum_{j=1}^{P} [y(k+j) - r(k+j)]^T W_y [y(k+j) - r(k+j)] + \quad (7)$$

$$[u(k) - u(k-1)]^T W_u [u(k) - u(k-1)]$$

subject to $$y(k+1) = y(k) + P\left(\sum_{i=0}^{n_T} \beta_i u(k-i)\right)$$

where r(k+j) is the desired profile (which is usually flat), $W_y$ and $W_u$ are positive semi-definite weighting matrices, and p is the control horizon.

Various prior art methods have made this computation feasible in view of time and hardware limitations by long sampling periods or by grouping sensors together in blocks. The control process of the present invention, in contrast, avoids such techniques, which can result in poor product quality. The control process of the present invention uses the singular value decomposition of the interaction matrix P, $$P = U\Lambda_P V^T, \quad (8)$$

where $\Lambda_P$ is a real $n_u \times n_u$ matrix whose diagonal elements are nonnegative, V is a real $n_u \times n_u$ orthogonal matrix (that is, $V^T V = I_{n_u}$), and U is the $n_y \times n_u$ matrix containing the left singular vectors of P where $n_u$ is the number of elements of u, $n_y$ is the number of elements of y, and $I_n$ is the n×n identity matrix. The matrices $\Lambda_P$, U and V are computed off-line using standard mathematical software. See, e.g., G. H. Golub and C. F. vanLoan, "Matrix Computations", John Hopkins University Press, Baltimore, Md., 1983, which is incorporated by reference herein. Due to strong interactions across the web, a number of the singular values of P may be zero or nearly zero.

Significantly, the control process of the invention approximates the finite polytope of equation (3) with an ellipsoid $$(u(k) - u_m)^T \Phi (u(k) - u_m) \leq \alpha, \quad (9)$$

where $u_m$ is the center of an ellipsoid and $\Phi$ defines the direction and relative length of the axes of an ellipsoid, and $\alpha$ is a scaling parameter. The matrix $\Phi$ may be selected to have the form (though there are other known suitable decompositions for the ellipsoid)

$$\Phi = V \Lambda_\Phi V^T, \quad (10)$$

where $\Lambda_\Phi$ is a real diagonal matrix whose diagonal elements are nonnegative. Selecting $\Phi$ of the form in equation (10) fixes the directions of the axes of the ellipsoid equation (9) in n-dimensional space, and simplifies its off-line computation.

Specifically, the general linear constraints $Au(k) \leq b$ form a bounded convex polytope enclosing an open neighborhood. According to the invention, the linear constraints are approximated as an ellipsoid to efficiently compute a suboptimal solution to equation (7). This approximation is done off-line, by computing the ellipsoid of maximal volume which is completely contained within the polytope defined by the linear constraints. An ellipsoid E is defined by $$E = \{u(k) | u(k) = By + d, \|y\| \leq 1\} \quad (11)$$

where d is a vector that defines the center of the ellipsoid and B is a symmetric positive definite matrix that defines the semi-axes of the ellipsoid.

The ellipsoid E may be written in an equivalent form. Solving for y in equation (11) gives $$y = B^{-1}(u(k) - d). \quad (12)$$

Inserting this expression for y into the constraint $y^T y \leq 1$, gives $$[B^{-1}(u(k) - d)]^T [B^{-1}(u(k) - d)] \leq 1. \quad (13)$$

Rearranging shows that the ellipsoid (E) is equivalent to $$E = \{u(k) | (u(k) - d)^T B^{-2} (u(k) - d) \leq 1\}. \quad (14)$$

This is exactly the form of equation (9) with $u_m = d$ and $\Phi = B^{-2}$.

Finding the largest (maximal volume) ellipsoid which is completely contained within the polytope $Au \leq b$ is a convex optimization problem that may be solved through conventional techniques:

$$\max_{B = B^T > 0} \log \det(B) \quad (15)$$

subject to $$\|BA_i\| + A_i^T d \leq b_i, \forall i \in [1, L] \quad (16)$$

where $A_i^T$ is a row vector corresponding to the ith row of A, $b_i$ is the ith element of b and L is the number of elements in b. $\|BA_i\|$ is the two norm of the vector $B A\_i$.

For the case where the center of the ellipsoid is known (e.g., d=0 when $Au \leq b$ defines a symmetric polytope), equation (15) subject to equation (16) can be written as a linear matrix inequality for which B can be computed with public domain software. See, e.g., S. Boyd and S. Wu. "sdpsol: a Parser/Solver for Semidefinite Programs with Matrix Structure", Stanford University, Stanford, Calif. 1996, which is incorporated by reference herein. In the case where d is unknown, equation (15) subject to equation (16) is not a linear matrix inequality but is still a convex program that can be solved, for instance, by interior point methods, such as those in Y. Nesterov and A. Nemirovskii, "Interior Point Polynomial Algorithms in Convex Programming", volume 13 of *Studies in Applied Mathematics,* SIAM, Philadelphia, Pa., 1994.

The matrix B that defines the semi-axes of the ellipsoid is a symmetric positive definite matrix, which means that it has a singular value decomposition $$B = V \Lambda_B V^T \quad (17)$$

Substituting this expression for B into equation (15) gives a much simpler problem structure.

$$\max_{\Lambda_{B,ii} > 0 \forall i} \sum_{i=1}^{n} \log \Lambda_{B,ii} \quad (18)$$

subject to $$\left[\sum_{i=1}^{n} (\Lambda_{B,ii} A_{ji})^2\right] - b_j \leq 0 \quad \forall j = 1, \ldots, L \quad (19)$$

This is a suboptimal solution to equation (15) but equation (18) subject to equation (19) is very easy to solve, for instance, by successive quadratic programming, because the objective function and constraints are convex and the gradients for each variable and each constraint can be computed analytically.

Having fixed the ellipsoid axes and simplified the off-line computation, equations (8), (9), and (10) are substituted into equation (7) to give the simplified quadratic program with convex quadratic constraint:

$$\min_{\hat{u}(k)} \sum_{j=1}^{p} ([y(k+j) - r(k+j)])^T W_y [y(k+j) - r(k+j)] + \quad (20)$$

$$([\hat{u}(k) - \hat{u}_m])^T W_u [\hat{u}(k) - \hat{u}_m]$$

subject to $$y(k+1) = y(k) + U\Lambda_P\left[\sum_{i=0}^{n_T}\beta_i \hat{u}(k-i)\right], \quad (21)$$

and $$(\hat{u}(k) - \hat{u}_m)^T \Lambda_\Phi (\hat{u}(k) - \hat{u}_m) \leq \alpha, \quad (22)$$

where $\hat{u}(k) = V^T u(k)$, and $\hat{u}_m = V^T u_m$. The weights $W_y$ and $W_u$ are assumed to be diagonal and are typically chosen by the control engineer to be a constant multiplied by the identity matrix. The polytope is also equivalently written in transformed coordinates:

$$u_l \leq V\hat{u}(k) \leq u_h, \quad l_b \leq FV\hat{u}(k) \leq l_b. \quad (23)$$

It is useful at this point to define two quantities, $$R(j) = \begin{cases} y(k) - r(k+j) + U\Lambda_P\left[\sum_{i=j}^{n_T}\beta_i\left(\sum_{i=0}^{n_T}\hat{u}(k+i-q)\right) + \sum_{i=j}^{n_T}\beta_i\left(\sum_{q=0}^{j-1}\hat{u}(k+i-q)\right)\right], & j \leq n_T \\ y(k) - r(k+j) + U\Lambda_P\left[\sum_{i=0}^{n_T}\beta_i\left(\sum_{q=0}^{i-1}\hat{u}(k+i-q)\right)\right], & j > n_T \end{cases} \quad (24)$$

and $$\gamma_j = \begin{cases} \sum_{i=0}^{j-1}(j-i)\beta_i & j \leq n_T \\ \sum_{i=0}^{n_T}(j-i)\beta_i & j > n_T \end{cases} \quad (25)$$

The optimal solution to equation (20) can be solved very efficiently via Lagrange multipliers. Equation (21) is substituted into equation (20) and the lone inequality constraint (22) introduces one Lagrange multiplier $\lambda > 0$. The optimal solution must satisfy:

$$\frac{d}{d\hat{u}(k)}\left[\sum_{j=1}^{P}([R(j) + \gamma_j U\Lambda_P \hat{u}(k)])^T W_y[R(j) + \gamma_j U\Lambda_P \hat{u}(k)] + \right. \quad (26)$$

$$([\hat{u}(k) - \hat{u}(k-1)])^T W_u[\hat{u}(k) - \hat{u}(k-1)]\right] +$$

$$\left. \lambda \frac{d}{d\hat{u}(k)}[(\hat{u}(k) - \hat{u}_m)^T \Lambda_\Phi(\hat{u}(k) - \hat{u}_m) - \alpha]\right] = 0$$

Preferably, implementation of the invention first computes and tests an unconstrained solution, which is accepted if no constraints are violated. If constraints are violated, then a solution is determined iteratively until a constraint is found active. Thus, the first step of the preferred control process is to compute the optimal unconstrained actuator moves $\hat{u}^\dagger(k)$ (that is, with $\lambda = 0$)

$$\hat{u}_i^\dagger(k) = \frac{N_i}{D_{ii}} \quad (27)$$

$$D = \left(\sum_{j=1}^{p}\gamma_j^2\right)\Lambda_P^T W_y \Lambda_P + W_u \quad (28)$$

$$N = \left[W_u \hat{u}(k-1) - \Lambda_P U^T W_y\left(\sum_{j=1}^{p}\gamma_j R(j)\right)\right] \quad (29)$$

where the subscript $x_i$ denotes the ith element of the vector x and $X_{ii}$ denotes the ith diagonal element of the matrix X.

Note that D can be calculated once off-line and stored and N is calculated only once for every control move to be implemented. If $\hat{u}^\dagger(k)$ satisfies equation (23), then these actuator moves are implemented on the real process, otherwise, the algorithm computes the constrained solution $\hat{u}(k)$. This means solving a system of $n_u + 1$ algebraic equations with $n_u + 1$ unknowns.

$$\left[\left(\sum_{j=1}^{p}\gamma_j^2\right)\Lambda_P^T W_y \Lambda_P + W_u + \lambda\Lambda_\Phi\right]_{ii}\hat{u}_i(k) = \left[(\lambda\Lambda_\Phi \hat{u}_m + W_u \hat{u}(k-1) - \Lambda_P U^T W_y\left(\sum_{j=1}^{p}\gamma_j R(j)\right)\right]_i \quad (30)$$

$$\forall i = 1, \ldots, n_u$$

$$(\hat{u}(k) - \hat{u}_m)^T \Lambda_\Phi(\hat{u}(k) - \hat{u}_m) = \alpha \quad (31)$$

Or, equivalently, $$([D + \lambda\Lambda_\Phi])_{ii}\hat{u}_i(k) = ([\lambda\Lambda_\Phi \hat{u}_m + N])_i \quad \forall i = 1, \ldots, n_u \quad (32)$$

$$(\hat{u}(k) - \hat{u}_m)^T \Lambda_\Phi(\hat{u}(k) - \hat{u}_m) = \alpha \quad (33)$$

The first $n_u$ algebraic equations (32) can be solved for $\hat{u}_i(k)$ and substituted into (33) which gives $$h(\lambda) \equiv \sum_{i=1}^{n_u}\Lambda_{\Phi,ii}[\hat{u}_i(k) - \hat{u}_{m,i}]^2 = \quad (34)$$

$$\sum_{i=1}^{n_u}\Lambda_{\Phi,ii}\left[\frac{(\lambda\Lambda_\Phi \hat{u}_m + N)_i}{(D + \lambda\Lambda_\Phi)_{ii}} - \hat{u}_{m,i}\right]^2 = \alpha.$$

Rearranging shows $h(\lambda)$ to be monotonic in $\lambda$:

$$h(\lambda) = \sum_{i=1}^{n_u} \Lambda_{\Phi,ii} \left[ \frac{W_{u,ii}(\hat{u}_i(k-1) - \hat{u}_{m,i}) - \left(\left[\Lambda_P U^T W_y \left(\sum_{j=1}^p \gamma_j R(j)\right)\right]\right)_i - \left[\left(\sum_{j=1}^p \gamma_j^2\right)\Lambda_{P,II} W_{y,ii}\Lambda_{P,II}\right]\hat{u}_{m,i}}{\left[\sum_{j=1}^p \gamma_j^2 \Lambda_{P,ii} W_{y,ii} \Lambda_{P,ii} + W_{u,ii} + \lambda\Lambda_{\Phi,ii}\right]} \right]^2 = \alpha \quad (35)$$

Consequently, $h(\lambda)=\alpha$ has a unique solution which is determined via bisection. Substituting $\lambda$ into the first $n_u$ algebraic equations gives the $\hat{u}(k)$ which solves the nonlinear program (20)–(22) for a fixed scaling parameter $\alpha$. The value of $\alpha$ is iterated until the resulting $\hat{u}(k)$ lies on the boundary of the polytope (23). Properties of the ellipsoid approximation imply that $\alpha$ can be computed via bisection and will converge to a value between 1 and $\alpha_{max}=\hat{u}^\dagger(k)^T\hat{u}^\dagger(k)$.

The actuator moves $u(k)$ to be implemented on the process are calculated from $u(k)-V\hat{u}(k)$ with the following exception. In practice, the experimental data used to construct the process model are not sufficiently informative to accurately identify many of the singular values and singular vectors in equation (8). Attempting the control these spatial modes across the web machine will lead to very poor performance. The present ellipsoid process is ideally suited to control only those singular vectors that are controllable. Since it uses the singular value decomposition of the plant to diagonalize the controller, each $\hat{u}_i$ is independent and corresponds to a singular value of the process. Thus, if the singular value is known to be poorly captured by the process model (whether this is true can be determined using multivariable statistics), see, e.g., A. P. Featherstone and R. D. Braatz. "Model-Oriented Identification of Sheet and Film Processes", *AIChE J.*, 43:1989–2001, 1997, A. P. Featherstone and R. D. Braatz, "Integrated Robust Identification and Control of Large Scale Processes", *Ind. Eng. Chem. Res.*, 37:97–106, 1998, A. P. Featherstone and R. D. Braatz, "Input Design for Large Scale Sheet and Film Processes", *Ind. Eng. Chem. Res.*, 37:449–454, 1998, then the corresponding $\hat{u}_i$ is simply set to zero.

Artisans will appreciate that the present process requires no on-line calculations of matrix inverses, singular value decompositions, or determinants. Advantageously, the number of iterations (number of times $h(\lambda)$ is computed) for convergence is not a function of the size of the interaction matrix. The most computationally expensive steps in the algorithm for large $n_u$ and $n_y$ are the matrix multiplications required to translate between $(\hat{u}, y)$ and $(u, y)$ coordinates. This is in contrast to the conventional (QP) control algorithm which attempts to solve equation (7) exactly, and whose on-line computational expense is therefore a higher order polynomial function of $n_u$.

A REALISTIC PAPER MACHINE MODEL

In order to demonstrate the properties of the present robust ellipsoid (RE) algorithm, a model was developed from industrial data that reflects the realities of an industrial paper machine. The model was developed from industrial identification data reported by E. M. Heaven, T. M. Kean, I. M. Jonsson, M. A. Manness, K. M. Vu and R. N. Vyse, "Applications of System Identification to Paper Machine Model Development and Controller Design", *Second IEEE Conf. on Control Applications*, pp. 227–233, Vancouver, British Columbia, Canada, Sep. 13–16, 1993, who studied the slice lip to basis weight transfer function of a fine paper machine. The actuators are the motors which change the slice lip openings and the weight profile is measured by a scanning sensor at the reel of the machine. They reported observing significantly different gains at the edges of the industrial paper machine but chose to average out these differences. On the other hand, we believe the different gains at the edges to be a significant feature of real paper machines. The model has the form $$y(k+1)=P(u(k-1)+a_1 u(k-2)) \quad (36)$$

where $y(k+1)$ is the vector of measurements of basis weight (in lbs.) at time k+1, $u(k-1)$ is the vector of actuator positions (in mils.) at time k−1, and P is the interaction matrix (with units of lbs./mil.). The model structure with a time delay of 2 is taken from Equations 5 and 9 of E. M. Heaven, T. M. Kean, I. M. Jonsson, M. A. Manness, K. M. Vu and R. N. Vyse, "Applications of System Identification to Paper Machine Model Development and Controller Design", *Second IEEE Conf. on Control Applications*, pp. 227–233, Vancouver, British Columbia, Canada, Sep. 13–16, 1993 and $a_1=-0.1533$ as reported in Table 7 of Heaven et al.

Writing equation (36) for the previous time instance and subtracting, and including a disturbance term, gives $$y(k+1)=y(k)+P[u(k-1)-(1-a_1)u(k-2)-a_1 u(k-3)+b_1 w(k)]. \quad (37)$$

where $w(k)$ is a zero-mean Gaussian white noise signal that is integrated by the plant dynamics. This signal represents process disturbances and real paper machines are known to have disturbances of this sort (see, e.g., Equation 3 in Heaven et al.). The magnitude of the disturbances $b_1=0.015$ was selected based on FIGS. 7 and 8 of Heaven et al.

The interaction matrix P is of the form $$P=C\Lambda_G \quad (38)$$

where the matrix $$C = \begin{bmatrix} c_2 & c_7 & c_{12} & \cdots & c_{37} & 0 & \cdots & 0 & 0 \\ c_1 & c_6 & c_{11} & \cdots & c_{36} & 0 & \cdots & 0 & 0 \\ c_0 & c_5 & c_{10} & \cdots & c_{35} & 0 & \cdots & 0 & 0 \\ c_1 & c_4 & c_9 & \cdots & c_{34} & 0 & \cdots & 0 & 0 \\ c_2 & c_3 & c_8 & \cdots & c_{33} & c_{38} & \cdots & 0 & 0 \\ \vdots & \vdots & \vdots & \ddots & \vdots & \vdots & \ddots & \vdots & \vdots \\ c_{35} & c_{30} & c_{25} & \cdots & c_0 & c_5 & \cdots & \vdots & \vdots \\ c_{36} & c_{31} & c_{26} & \cdots & c_1 & c_4 & \cdots & \vdots & \vdots \\ c_{37} & c_{32} & c_{27} & \cdots & c_2 & c_3 & \cdots & \vdots & \vdots \\ c_{38} & c_{33} & c_{28} & \cdots & c_3 & c_2 & \cdots & \vdots & \vdots \\ 0 & c_{34} & c_{29} & \cdots & c_4 & c_1 & \cdots & \vdots & \vdots \\ \vdots & \vdots & \vdots & \ddots & \vdots & \vdots & \ddots & \vdots & \vdots \\ \vdots & \vdots & \vdots & \cdots & \vdots & \vdots & \cdots & c_2 & c_3 \\ \vdots & \vdots & \vdots & \cdots & \vdots & \vdots & \cdots & c_3 & c_2 \\ \vdots & \vdots & \vdots & \cdots & \vdots & \vdots & \cdots & c_4 & c_1 \\ \vdots & \vdots & \vdots & \cdots & \vdots & \vdots & \cdots & c_5 & c_0 \\ \vdots & \vdots & \vdots & \cdots & \vdots & \vdots & \cdots & c_6 & c_1 \\ 0 & 0 & 0 & \cdots & 0 & 0 & \cdots & c_7 & c_2 \end{bmatrix} \quad (39)$$

$$c_i = \begin{cases} -0.1322i + 1 & i = 0, 1, \ldots 10 \\ -1.3178 \times 10^{-8} i^6 + 2.1221 \times 10^{-6} i^5 - \\ \quad 1.4006 \times 10^{-4} i^4 + 4.8607 \times 10^{-3} i^3 - & i = 11, 12, \ldots, 38 \\ \quad 9.4066 \times 10^{-2} i^2 + 0.97362 i - 4.3108 \end{cases} \quad (40)$$

represents the interactions between 130 actuators and 650 downstream measurement locations. The diagonal matrix $\Lambda_G$ captures the variation of the actuator gains across the machine:

$$\Lambda_{G,ii} = \begin{cases} 7.4167 \times 10^{-4}(i^2) - 2.1917 \times 10^{-3} i + 0.3015 & i = 1, 2, \ldots 10 \\ -1.1392 \times 10^{-10} i^6 + 4.1401 \times 10^{-8} i^5 - \\ \quad 5.9244 \times 10^{-6} i^4 + 4.2284 \times 10^{-4} i^3 - & i = 11, 12, \ldots, 43 \\ \quad 1.5624 \times 10^{-2} i^2 + 0.2751 i - 1.2015 \\ 0.4692 & i = 44, 45, \ldots, 87 \\ \Lambda_{G,130-i+1,130-i+1} & i = 88, 89, \ldots, 130 \end{cases} \quad (41)$$

Figure 5:
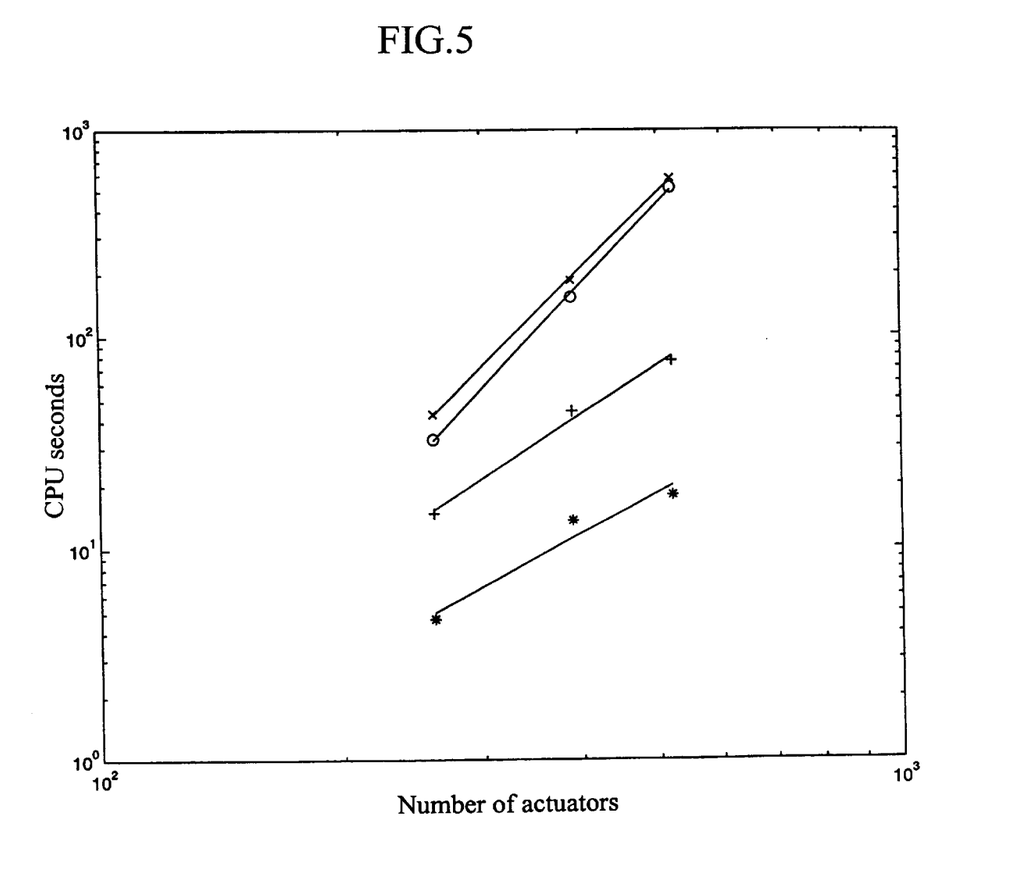
FIG. 5 is a CPU time plot for the two algorithms as a function of the number of actuators. "x" is the QP (slope=3.73) "o" is the QP not counting the time for computing the linear term of the objective function (slope=3.96). "+" is the time for the RE algorithm (slope=2.38), and "*" is the time for the RE without the linear term (slope=1.99). Each point is the average of ten simulations. The simulations were run on a Sparc Ultra 1 workstation (143 MHZ) with 64 MB of RAM.
Figure 6A:
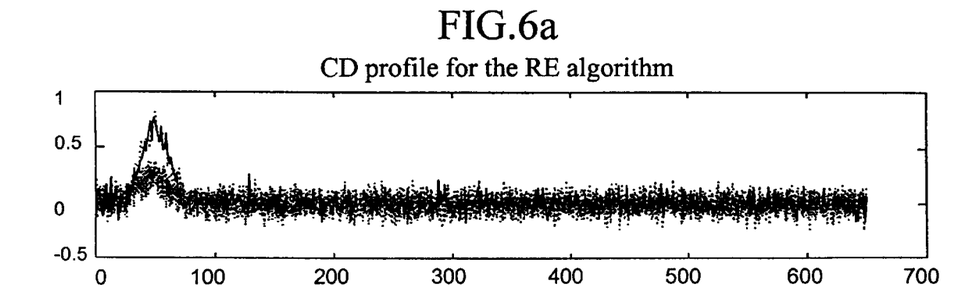
FIG. 6a–6d are measurement profiles and manipulated variable settings for the QP and RE processes when the plant is misidentified. The initial measurement profile is shown as a solid line, subsequent profiles are dashed. In all, ten control moves are shown.
Figure 6B:
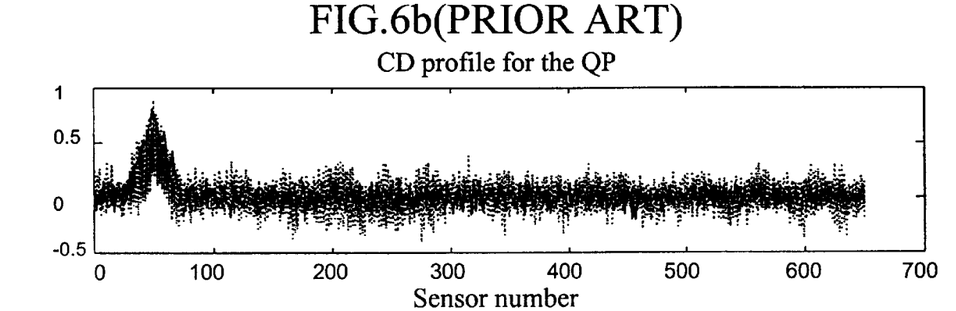
Figure 6C:
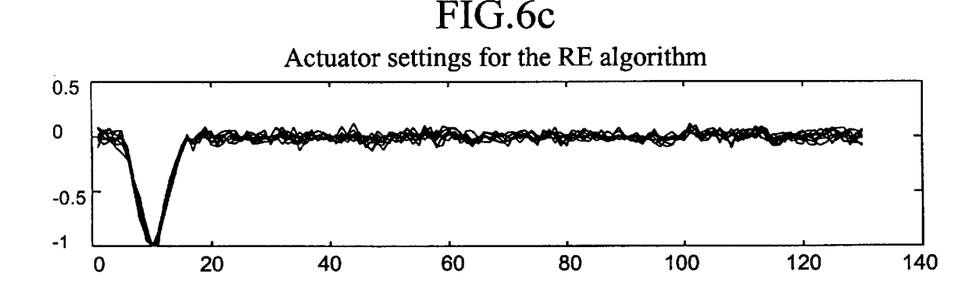
Figure 6D:
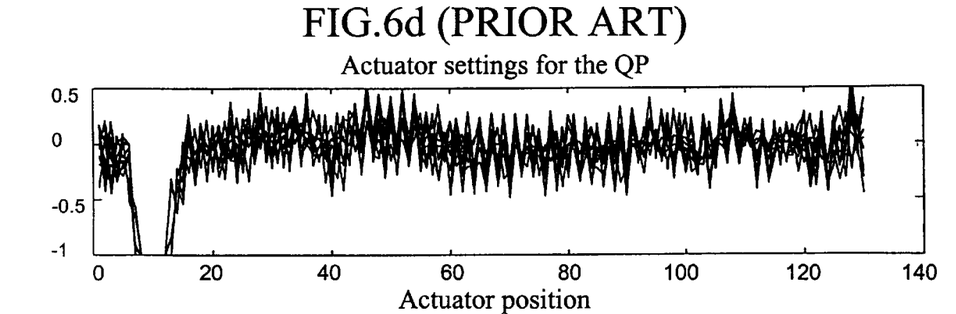
Figure 7A:
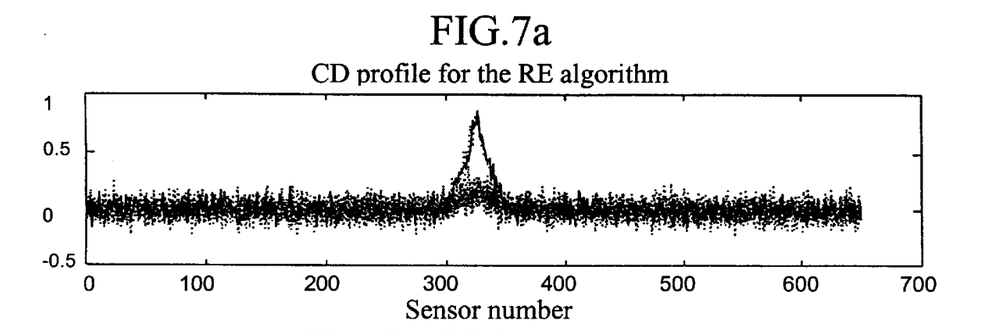
FIGS. 7a–7d are measurement profiles and manipulated variable settings for the QP and RE processes when the plant is misidentified. The initial measurement profile is shown as a solid line, subsequent profiles are dashed. In all, ten control moves are shown.
Figure 7B:
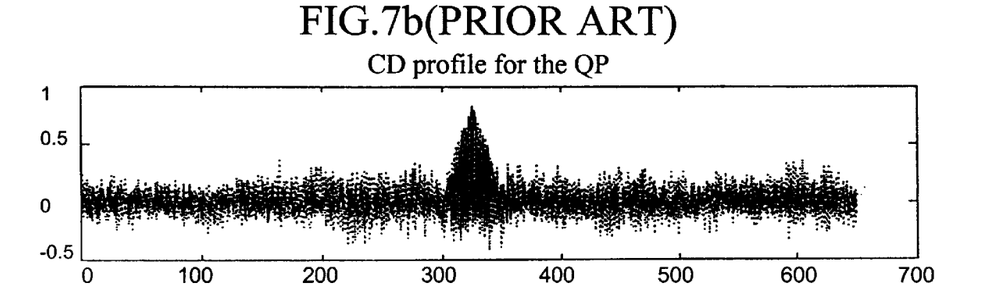
Figure 7C:
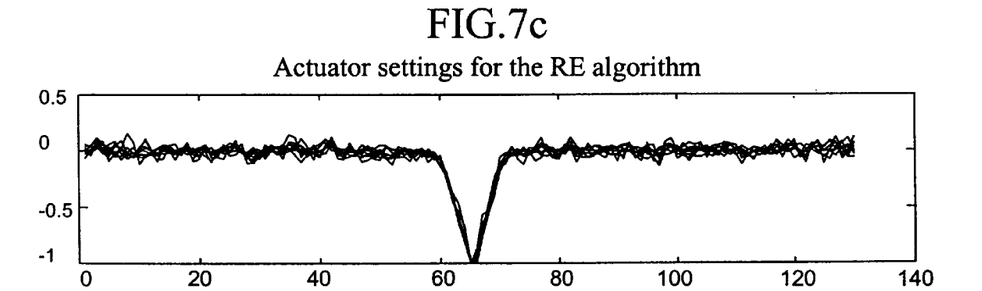
Figure 7D:
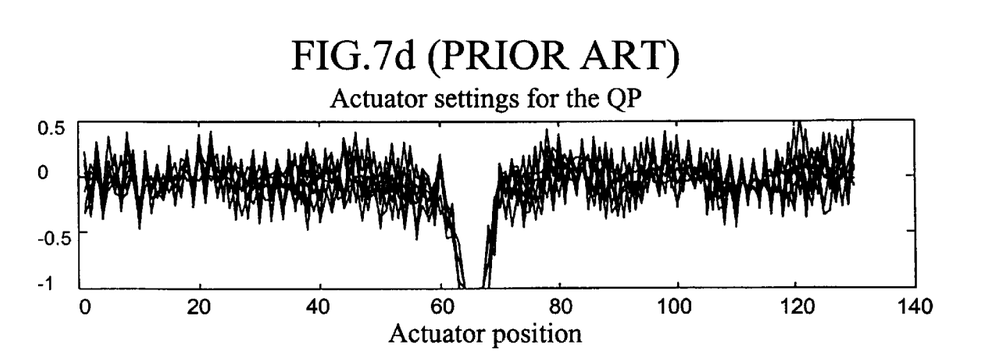
Figure 8A:
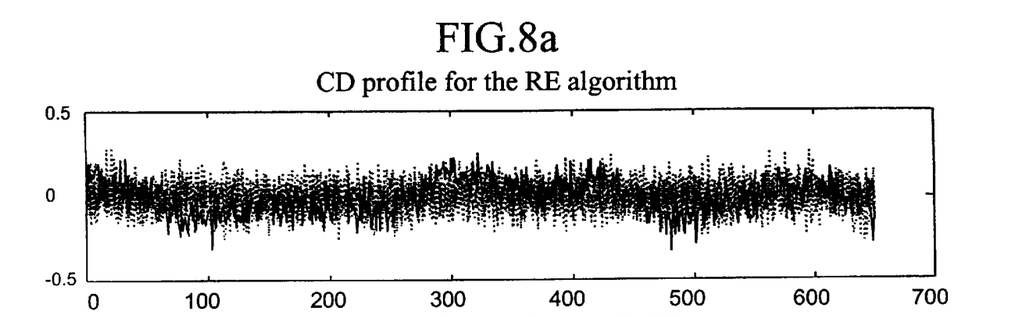
FIGS. 8a–8d are measurement profiles and manipulated variable settings for the QP and RE processes when the plant is misidentified. The initial measurement profile is shown as a solid line, subsequent profiles are dashed. In all, ten control moves are shown.
Figure 8B:
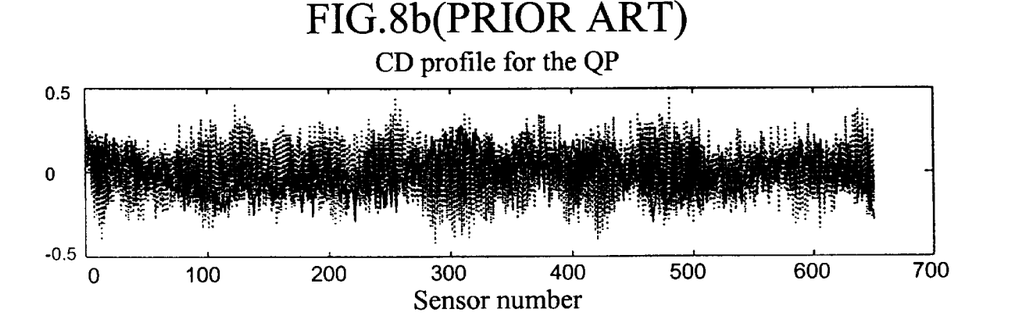
Figure 8C:
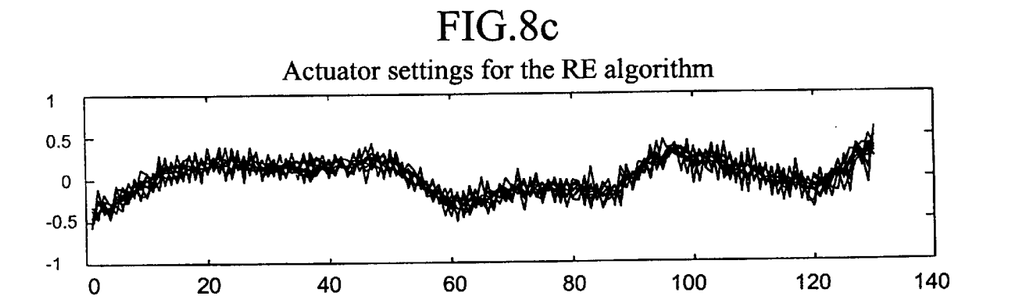
Figure 8D:
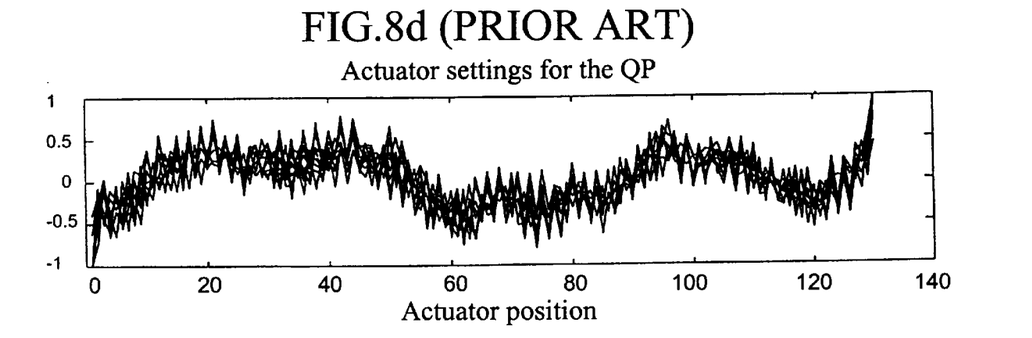

The c vector was fit from data in FIGS. 3 and 5 of Heaven et al.; and $\Lambda_G$ was fit from data in Table 2 of of Heaven et al.

FIG. 7 in Heaven et al. shows constraints on the actuators of the form (4) with $u_l=-0.8$ and $u_h=1.2$. For the model being developed here, these constraints will be re-centered ($u_l=-1$, $u_h=1$). Additionally, we will impose constraints of the form of equation (5) with $l_b=1$, as constraints of this type are usually specified for real paper machines.

The measurement is subject to noise $$y_{meas}(k) = y(k) + b_2 v(k) \quad (42)$$

TABLE 1

Steady state variances of the measured profile and CPU time required to solve the problem on a Sparc Ultra 1 (143 MHZ) with 64 MB of RAM for the three different initial profiles.

| $n_u$ =130, $n_y$ = 650 | side bump | center bump | pseudo-random profile |
|---|---|---|---|
| QP | 2.042 ± 0.003 | 1.877 ± 0.003 | 1.840 ± 0.005 |
| RE | 2.102 ± 0.003 | 1.897 ± 0.002 | 1.838 ± 0.003 |
| QP with plant model mismatch | 3.274 ± 0.020 | 3.337 ± 0.009 | 3.224 ± 0.043 |
| RE with plant model mismatch | 2.150 ± 0.008 | 1.913 ± 0.003 | 1.836 ± 0.004 |
| CPU seconds for the QP | 2.4158 ± 0.0049 | 2.2663 ± 0.0022 | 1.9712 ± 0.0013 |
| CPU seconds for the RE | 1.0032 ± 0.0003 | 0.9761 ± 0.0012 | 1.0376 ± 0.0004 | where y(k) is given by equation (37) and v(k) is vector of zero-mean Gaussian white noise chosen to be representative of the data obtained from a real paper machine (e.g., Equation 3 in Heaven et al.). The magnitude of the noise $b_2$ was chosen to be equal to 0.067 in order to match the level of noise in FIGS. 7 and 8 of Heaven et al.

SIMULATION RESULTS AND DISCUSSION

The present process was compared to conventional model predictive control on the paper machine model. The traditional model predictive control formulation results in a constrained quadratic program (QP) with $n_u$ decision variables. This QP was solved using IMSL QP solver. For the closed loop simulations shown here, the controller tuning parameters, $W_y$ and $W_u$, were chosen to be 2I and 0.01I respectively.

The closed loop performance of the present process and traditional process were tested on the paper machine model with three different initial measured profiles, one with a bump near the edge, one with a bump near the center, and a pseudo-random profile. The steady state (after ten time steps) variance for each method, for each initial profile, is given in Table 1, above. Each number given in Table 1 is computed from ten simulations. The present invention and the conventional processes achieve similar measured profiles (see FIGS. 2, 3, 4 and Table 1), but the present invention has a much smoother series of input vectors (see FIGS. 2, 3 and 4), which produces less stress on the slice lip, and does so with 50–60% less computation time for 130 actuators (see e.g., Table 1). The speed advantage of the present ellipsoid algorithm becomes more dramatic with increasing problem size (see, e.g., FIG. 5).

As discussed above, many of the smaller singular values are poorly identified in practice. The corresponding singular vectors are also poorly known, and in fact, even their general direction cannot be predicted with confidence from the experimental data. To compare the robustness of the two algorithms to plant/model mismatch, a coin was flipped for the last 20 diagonal elements of $\Lambda_P$. On a head the direction of the corresponding singular vector in U was flipped. This resulted in flipping the singular vectors for i=113, 116, 117, 118, 119, 121, 126, 127, 129, 130. We will call this new plant $\hat{P}$ for the sake of discussion. For each controller, the manipulated variable vector was calculated based on P but was implemented on P̂. For the present invention, û$_i$ was set equal to zero for i=111, ..., 130, i.e., we chose not to control the singular vectors corresponding to the 20 smallest singular values.

The misidentified plant results in poor performance for the conventional quadratic program process, but the performance of the present ellipsoid process suffers only slightly (see FIGS. 6, 7, 8, and Table 1). Also, the jaggedness of the quadratic program process manipulated variable vectors becomes more pronounced while the present ellipsoid process manipulated variable vectors are virtually the same (see FIGS. 6, 7 and 8). In fact, by not controlling the uncontrollable plant directions, the present ellipsoid process tends to produce unconstrained solutions, which are optimal and faster to calculate.

The computational cost of solving a conventional quadratic program process is bounded by $O(n^{3.5}\log(n))$, where n is problem size. The present invention's most expensive step is a matrix-vector multiplication, which is $O(n^2)$. FIG. 5 shows how the computation time required to solve the optimization problem grows as a function of the number of actuators (size of the interaction matrix P) for the present (RE) and conventional (QP) algorithms. Each point shown is the average solution time for ten simulations of ten time steps each. The slope of each line is an estimate of the rate of growth of the solution time as a function of the problem size, e.g., a slope of 3 means the solution time grows as $n_u^3$. Also shown is the time for each process not counting the time to compute the linear term (equation (29)) as part of the solution time. The linear term is part of the setup to the problem, and not part of the actual optimization. The time required by the RE algorithm grows more slowly as a function of $n_u$ than the time required by the QP. Thus, the present RE algorithm is fast enough to be implemented on real paper machines, even those of very high dimensionality, while providing robustness to model uncertainties.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A model predictive control process for controlling a physical process through actuators that have a polytopic defined constraint set defining the operational limitations of the actuators, the process comprising:
   periodically sampling one or more sensors whose outputs characterize operational results of the physical process;
   computing a desired set of manipulated variables, by conducting an off-line computation which approximates the constraint set as an ellipsoid;
   conducting an on-line scaling to scale the ellipsoid approximation to the constraint set and implement a selected control algorithm; and
   adjusting the actuators according to the scaling.
2. The model predictive control process of claim 1, wherein the step of conducting an on-line scaling comprises computation of a solution via bisection of the ellipsoid from the off-line computation.
3. The model predictive control process of claim 1, wherein said computation of said solution is first conducted as an unconstrained solution before conducting a scaling, and the unconstrained solution is accepted if it conforms to the constraint set.
4. The model predictive control process of claim 3, wherein said computation of said solution is conducted via said scaling as a constrained solution if the unconstrained solution fails to conform to the constraint set.
5. The model predictive control process of claim 4, wherein said constrained solution is iteratively scaled until the constrained solution yields an active constraint.
6. The model predictive control process of claim 1, wherein the physical process is defined as the constrained quadratic:

$$\min_z \|Hz - c\|_2^2$$

and the constraint set is represented as $$Fz \leq \alpha.$$

7. The model predictive control process of claim 6, wherein said off-line computation approximates the constraint set as an ellipsoid as:

$$\Phi = V\Lambda_\Phi V^T.$$

8. A model predictive control process having a constraint set approximated by the finite polytope:

$$u(k) \in \wp \equiv \{u(k)|Au(k) \leq b\}$$

and having a control move determined by computing $u_k$ as a solution to a quadratic program of the form:

$$\min_{u(k) \in \wp} \sum_{j=1}^{p} (y(k+j) - r(k+j))^T W_y(y(k+j) - r(k+j)) +$$

$$(u(k) - u(k-1))^T W_u(u(k) - u(k-1))$$

subject to $$y(k+1)y(k) + P\left(\sum_{i=0}^{n_T} \beta_i u(k-i)\right)$$

where r(k+j) is the desired profile $W_y$ and $W_u$ are positive semi-definite weighting matrices, and p is the control horizon, the process comprising the steps of:
   approximating the finite polytope with an ellipsoid of the form:

$$(u(k)-u_m)^T \Phi(u(k)-u_m) \leq \alpha,$$

where $u_m$ is the center and $\Phi$ defines the direction and relative length of the axes of an ellipsoid, and $\alpha$ is a scaling parameter, the matrix $\Phi$ is selected to have the form $$\Phi = V\Lambda_\Phi V^T,$$

where $\Lambda_\Phi$ is a real diagonal matrix whose diagonal elements are nonnegative;
   computing an optimal unconstrained actuator move of the form:

$$\hat{u}_i^\dagger(k) = \frac{N_i}{D_{ii}}$$

$$D = \left(\sum_{j=1}^{p} \gamma_j^2\right) \Lambda_P^T W_y \Lambda_P + W_u$$

$$N = \left(W_u \hat{u}(k-1) - \Lambda_P U^T W_y \left(\sum_{j=1}^{p} \gamma_j R(j)\right)\right)$$

where the subscript $x_i$ denotes the ith element of the vector x and $X_{ii}$ denotes the ith diagonal element of the matrix X; and, if the unconstrained solution fails to satisfy the constraints imposed by the polytope, computing an optimal constrained actuator move by solving the following system of algebraic equations:

$$\left(\left(\sum_{j=1}^{p} \gamma_j^2\right) \Lambda_P^T W_y \Lambda_P + W_u + \lambda \Lambda_\Phi\right)_{ii} \hat{u}_i(k) =$$

$$\left(\lambda \Lambda_\Phi \hat{u}_m + W_u \hat{u}(k-1) - \Lambda_P U^T W_y \left(\sum_{j=1}^{p} \gamma_j R(j)\right)\right)$$

$$\forall\ i\ 1, \ldots, n_u$$

$$(\hat{u}(k) - \hat{u}_m)^T \Lambda_\Phi (\hat{u}(k) - \hat{u}_m) = \alpha;\ \text{and}$$

making a control move according to the optimal unconstrained actuator move if the unconstrained solution satisfied the constraints imposed by the polytope, otherwise, making the optimal constrained actuator move.

\* \* \* \* \*

UNITED STATES PATENT AND TRADEMARK OFFICE
CERTIFICATE OF CORRECTION

PATENT NO. : 6,064,809  
DATED : May 16, 2000  
INVENTOR(S) : Braatz et al

Page 1 of 1

It is certified that error appears in the above-identified patent and that said Letters Patent is hereby corrected as shown below:

Column 2:
Line 13, delete "'96Preprints" and insert --'96 Preprints--.

Column 5:
Line 22, delete "a", first occurrence, and insert --α--.

Column 7:
Line 20, delete Equation (24) and insert the following equation:

$$R(j) = \begin{cases} \left| y(k) - r(k+j) + U\Lambda_p \left[ \sum_{i=0}^{n_T} \beta_i \left( \sum_{q=0}^{i-1} \hat{u}(k+i-q) \right) + \sum_{i=j}^{n_T} \beta_i \left( \sum_{q=0}^{i-1} \hat{u}(k+i-q) \right) \right] \right|, & j \leq n_T \\ \left| y(k) - r(k+j) + U\Lambda_p \left[ \sum_{i=0}^{n_T} \beta_i \left( \sum_{q=0}^{i-1} \hat{u}(k+i-q) \right) \right] \right|, & j > n_T \end{cases}$$

Line 63, delete, ")" and insert --)--.

Signed and Sealed this

Seventh Day of August, 2001

*Attest:*

Nicholas P. Godici

*Attesting Officer*

NICHOLAS P. GODICI  
*Acting Director of the United States Patent and Trademark Office*